(12) United States Patent
Maloney

(10) Patent No.: US 8,395,885 B2
(45) Date of Patent: Mar. 12, 2013

(54) POWER DISTRIBUTION SYSTEM, AND ELECTRICAL BUS ASSEMBLY AND ELECTRICAL CONDUCTOR MECHANISM THEREFOR

(75) Inventor: James Gerard Maloney, Industry, PA (US)

(73) Assignee: Eaton Corporation, Cleveland, OH (US)

( * ) Notice: Subject to any disclaimer, the term of this patent is extended or adjusted under 35 U.S.C. 154(b) by 173 days.

(21) Appl. No.: 12/878,445

(22) Filed: Sep. 9, 2010

(65) Prior Publication Data

US 2012/0063064 A1 Mar. 15, 2012

(51) Int. Cl.
*H02B 1/04* (2006.01)

(52) U.S. Cl. ........ 361/656; 361/627; 361/628; 361/644; 361/652

(58) Field of Classification Search .................. None
See application file for complete search history.

(56) References Cited

U.S. PATENT DOCUMENTS

| | | | | |
|---|---|---|---|---|
| 5,337,211 A | | 8/1994 | Reiner et al. | |
| 5,375,036 A | * | 12/1994 | Magdaleno | 361/673 |
| 5,768,092 A | * | 6/1998 | Nishitani | 361/627 |
| 5,969,937 A | * | 10/1999 | Rose et al. | 361/645 |
| 5,973,914 A | * | 10/1999 | Rose et al. | 361/627 |
| 6,472,605 B1 | * | 10/2002 | Griffith | 174/149 R |
| 6,813,142 B1 | | 11/2004 | Seff | |
| 6,920,038 B2 | | 7/2005 | Gehlbach | |
| 7,136,277 B2 | * | 11/2006 | Davis et al. | 361/644 |
| 7,295,427 B2 | * | 11/2007 | Muhlberger et al. | 361/634 |
| 7,372,692 B2 | | 5/2008 | Ranta et al. | |
| 7,449,645 B1 | * | 11/2008 | Flegel | 200/51.11 |
| 7,520,759 B2 | | 4/2009 | Seff et al. | |
| 7,553,175 B1 | | 6/2009 | Benson et al. | |

* cited by examiner

*Primary Examiner* — Boris Chervinsky
(74) *Attorney, Agent, or Firm* — Eckert Seamans Cherin & Mellott, LLC; Grant E. Coffield

(57) ABSTRACT

An electrical conductor mechanism is provided for an electrical bus assembly of a power distribution system, such as a residential load center, which includes a number of electrical switching apparatus, such as circuit breakers. The electric conductor mechanism includes at least one planar member having first and second opposing sides. The first side is attached to a corresponding stab of the electrical bus assembly. The second side is electrically connected to a corresponding one of the circuit breakers, thereby electrically connecting it to the stab of the electrical bus assembly. An electrical bus assembly and a power distribution system employing the aforementioned electrical conductor mechanism are also disclosed.

11 Claims, 3 Drawing Sheets

POWER DISTRIBUTION SYSTEM, AND ELECTRICAL BUS ASSEMBLY AND ELECTRICAL CONDUCTOR MECHANISM THEREFOR

BACKGROUND

1. Field

The disclosed concept relates generally to power distribution systems and, more particularly, to power distribution systems, such as electrical enclosures including electrical bus assemblies. The disclosed concept also relates to electrical bus assemblies for power distribution systems. The disclosed concept further relates to electrical conductor mechanisms for electrical bus assemblies.

2. Background Information

Electrical apparatus, such as electrical switching apparatus or electrical meters used in power distribution systems, are often mounted on or within an electrical enclosure (e.g., without limitation, a panelboard; a load center; a meter breaker panel) either individually or in combination with other electrical meters or switchgear (e.g., without limitation, circuit switching devices and circuit interrupters such as circuit breakers, contactors, motor starters, motor controllers and other load controllers).

The electrical enclosure is typically coupled to and supported by a structure such as, for example, a wall of a building, and includes a number of electrical bus members. Residential load centers, for example, include a number of electrical bus members having a plurality of contact stabs extending outwardly therefrom. Typically, a plurality of circuit breakers or other suitable electrical apparatus are mechanically coupled and electrically connected to the contact stabs and, in turn, to the electrical bus members, within the enclosure. Among the disadvantages associated with the electrical bus assemblies of known residential load centers is that the bus members are made from aluminum and, therefore, must be plated (e.g., without limitation, tin plated), in order to resist the formation of dangerous aluminum oxide, which results in overheating and can cause a fire.

There is, therefore, room for improvement in power distribution systems, and in electrical bus assemblies and electrical conductor mechanisms therefor.

SUMMARY

These needs and others are met by embodiments of the disclosed concept, which are directed to electrical conductor mechanisms for electrical bus assemblies of power distribution systems, such as load centers. Among other benefits, the electrical conductor mechanism provides an effective electrical connection between electrical apparatus and the corresponding electrical bus member of the load center while resisting overheating issues.

As one aspect of the disclosed concept, an electrical conductor mechanism is provided for an electrical bus assembly of a power distribution system. The electrical bus assembly comprises a plurality of stabs. The power distribution system includes a number of electrical switching apparatus. The electrical conductor mechanism comprises: at least one planar member including a first side and a second side opposite the first side, the first side being structured to be attached to a corresponding one of the stabs, the second side being structured to be electrically connected to a corresponding one of the electrical switching apparatus, thereby electrically connecting the corresponding one of the electrical switching apparatus to the electrical bus assembly.

Each of the stabs may have a plurality of contact surfaces, and the at least one planar member may be a plurality of planar members, such as copper tabs, wherein each of the planar members is structured to be attached to a corresponding one of the contact surfaces. Each of the stabs may have a first segment structured to receive a corresponding one of the electrical switching apparatus, and a second segment structured to receive another corresponding one of the electrical switching apparatus. A first one of the planar members may be disposed on the first segment, and a second one of the planar member may be disposed on the second segment. Each of the first segment and the second segment may include a first contact surface and a second contact surface disposed opposite the first contact surface. The first one of the planar members may be disposed on the first contact surface of the first segment, and the second one of the planar members may be disposed on the second contact surface of the second segment.

An electrical bus assembly and a power distribution system employing the aforementioned electrical conductor mechanism are also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

For purposes of illustration, embodiments of the invention will be described as applied to electrical conductor mechanisms for electrical bus assemblies for electrically connecting circuit breakers in a residential load center, although it will become apparent that they could also be applied to electrically connect any known or suitable electrical apparatus (e.g., without limitation, electrical meters; circuit switching devices; circuit interrupters other than circuit breakers, such as contactors, motor starters, motor controllers and other load controllers) in power distribution systems other than residential load centers such as, for example and without limitation, panelboards and meter breaker panels.

As employed herein, the term "electrical bus" or "electrical bus member" refers to any known or suitable electrical conductor which carries or transfers voltage, current or power.

As employed herein, the term "contact stab" or "stab" refers to a portion of the electrical bus member to which a corresponding electrical apparatus (e.g., without limitation, an electrical switching apparatus; an electrical meter) is electrically connected.

As employed herein, the term "fastener" refers to any suitable connecting or tightening mechanism expressly including, but not limited to, rivets, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the statement that two parts are "attached" shall mean that the parts joined directly together, without any intermediate parts.

As employed herein, the term "number" shall mean one or an integer greater than one (i.e., a plurality).

Figure 1:
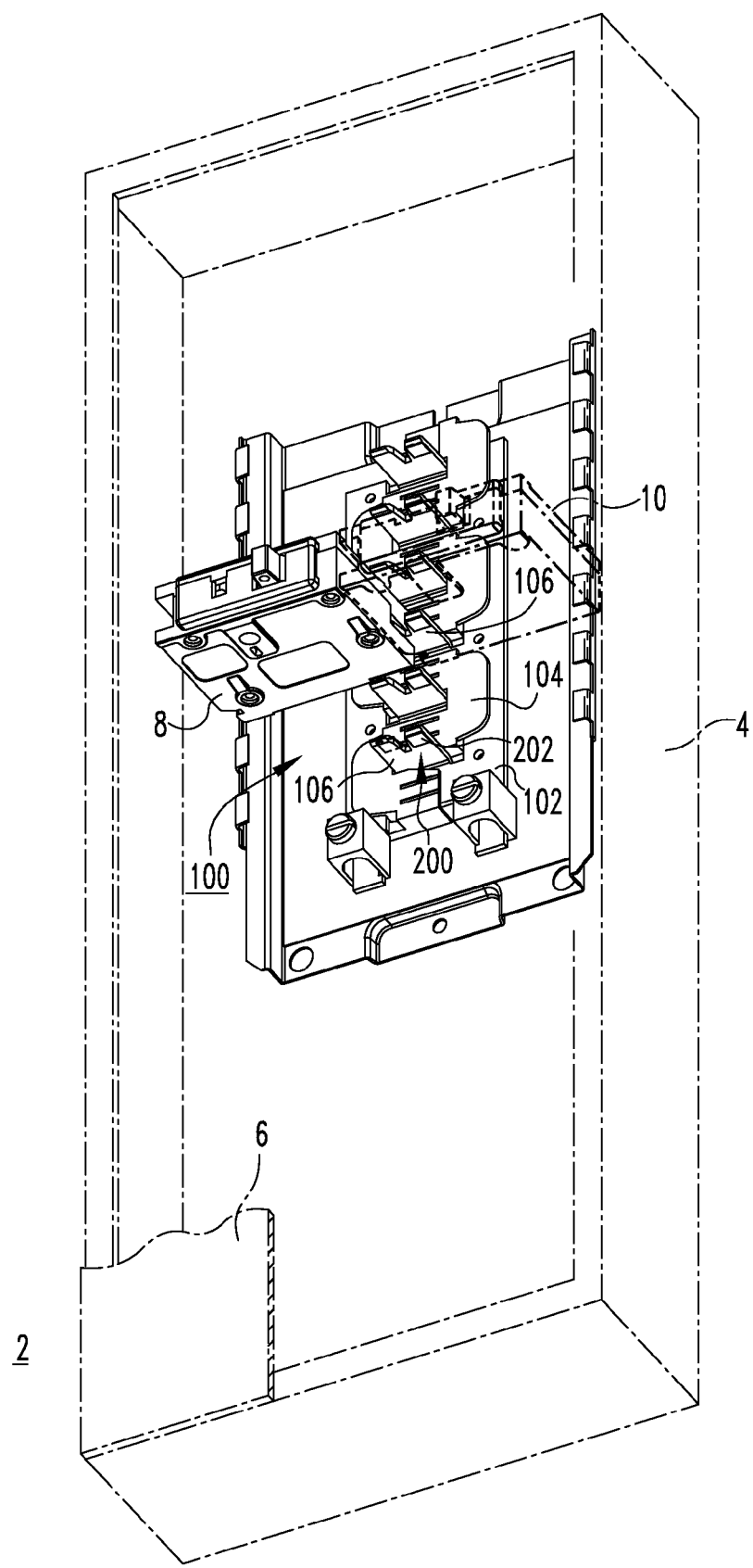
FIG. 1 is an isometric view of a load center, and electrical bus assembly and electric conductor mechanism therefor, in accordance with an embodiment of the disclosed concept, with the cover of the electrical enclosure being substantially cut away to show internal structures.

FIG. 1 shows an electrical conductor mechanism 200 for an electrical bus assembly 100 of a power distribution system, such as a residential load center 2 (shown in simplified form in phantom line drawing). The load center 2 generally includes an enclosure 4 (shown in simplified form in phantom line drawing in FIG. 1) with a cover 6 (e.g., without limitation, cover panel; door) (partially shown in phantom line drawing in FIG. 1). The electrical bus assembly 100 is disposed within the enclosure 4, and is structured to receive a number of electrical switching apparatus such as, for example and without limitation, the circuit breakers 8 (shown in solid line drawing), 10 (shown in phantom line drawing), shown in FIG. 1. It will be appreciated that only one circuit breaker 8 is shown and described in detail herein for economy of disclosure and ease of illustration, although any known or suitable alternative number, type and/or configuration of electrical switching apparatus (not shown) could be employed, without departing from the scope of the disclosed concept.

Figure 2:
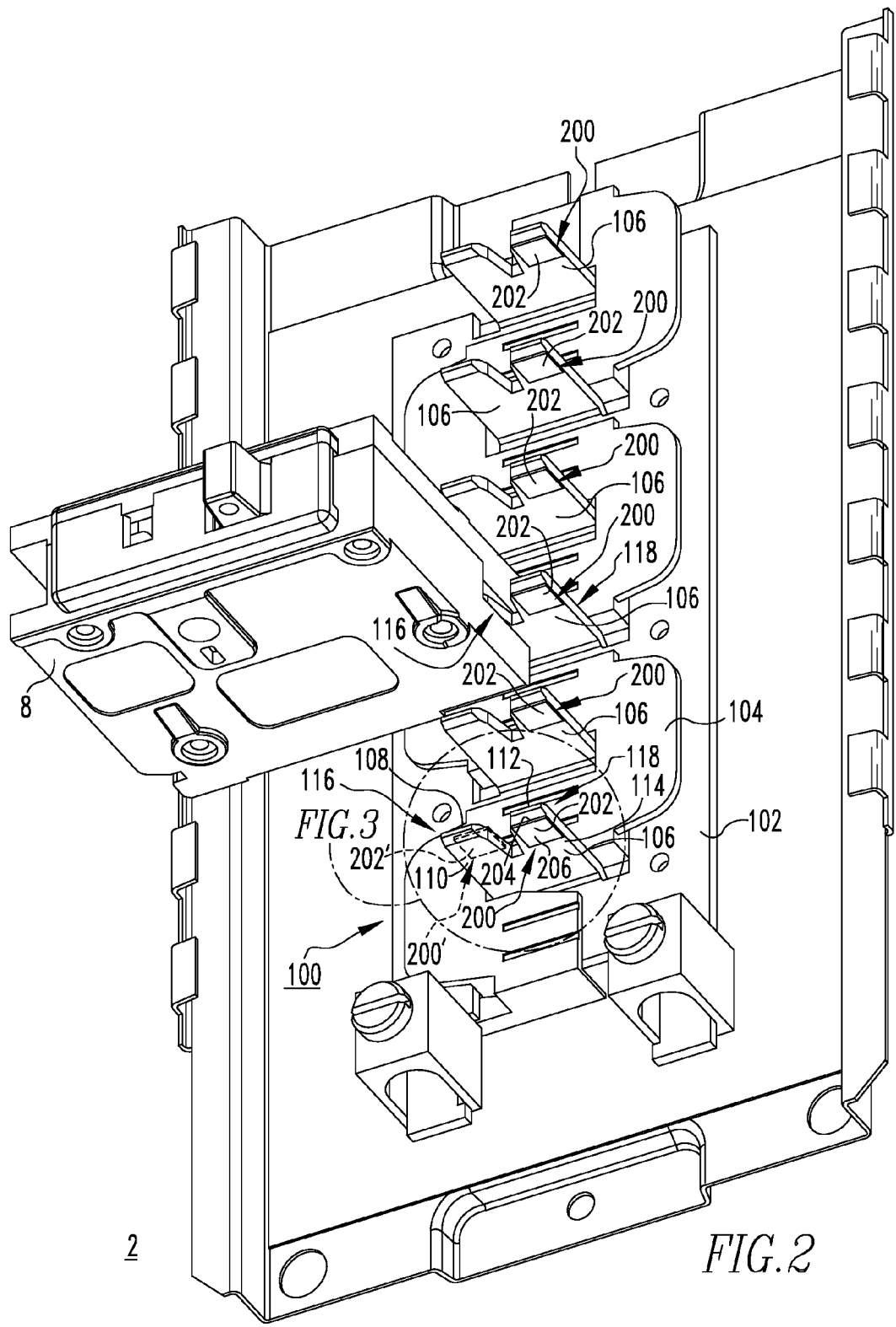
FIG. 2 is an isometric view of a portion of the load center, and electrical bus assembly and electrical conductor mechanism therefor of FIG. 1.
Figure 3:
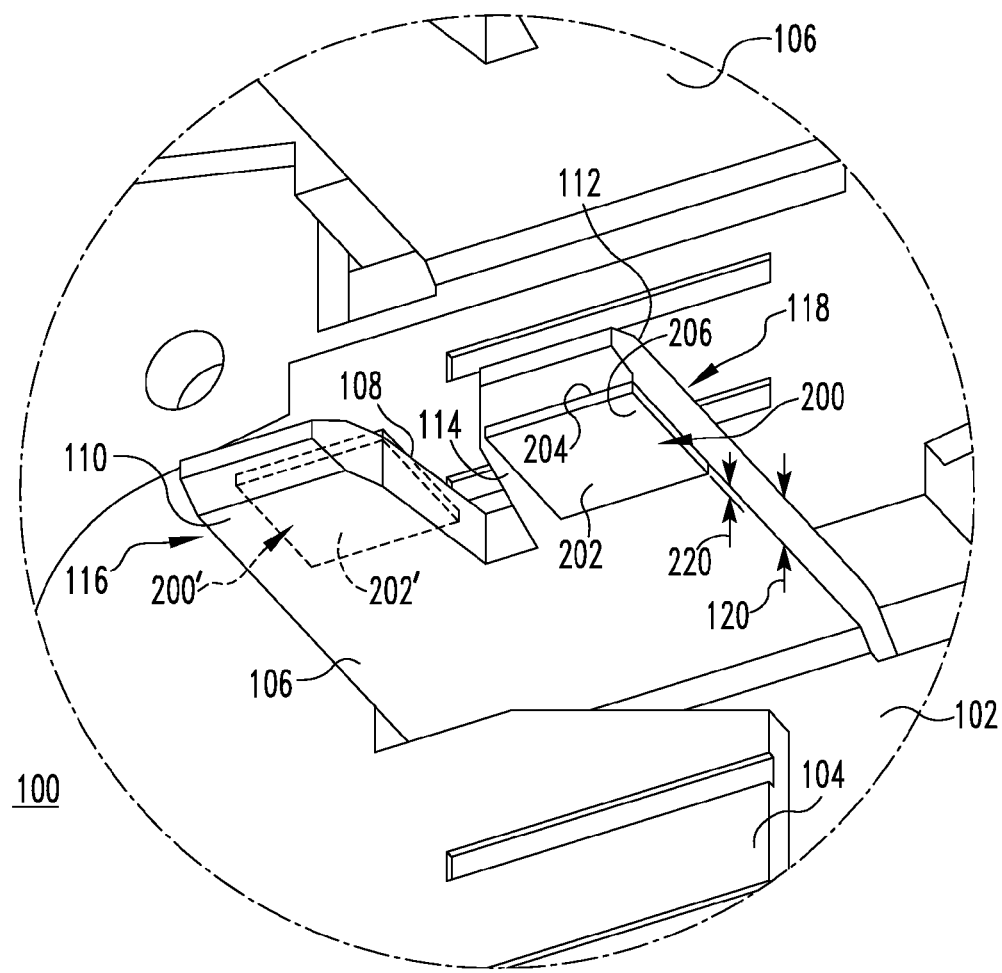
FIG. 3 is an enlarged isometric view of one of a portion of the electrical bus assembly and electrical conductor mechanism therefor of FIG. 2.

Continuing to refer to FIG. 1, and also to FIGS. 2 and 3, the electrical bus assembly 100 includes a number of electrical bus member 102,104 (two are shown). A plurality of stabs 106 extend outwardly from a corresponding one of the bus members 102. In the non-limiting example shown and described herein, six stabs 106 extend perpendicularly outwardly from electrical bus member 102 of the electrical bus assembly 100. The aforementioned electrical conductor mechanisms 200 are employed on the stabs 106. Specifically, each electrical conductor mechanism 200 includes a planar member 202, 202' having first and second opposing sides 204,206. The first side 204 is attached to a corresponding one of the stabs 106, and the second side 206 is structured to be electrically connected to a corresponding one of the circuit breakers 8,10. In this manner, the electrical conductor mechanism 200 electrically connects the corresponding circuit breaker 8,10 to the corresponding stab 106.

Preferably, the electrical conductor mechanism 200 is a copper tab 202,202' (both shown in FIGS. 2 and 3), which is attached directly to the corresponding stab 106, without any separate fastener(s). For example and without limitation, in the example shown and described herein, the copper tabs 202,202' are attached to the stabs 106 by ultrasonic welding, which is a generally well known solid-state welding process that does not use any solder or flux. It will, however, be appreciated that any known or suitable alternative method or process (e.g., without limitation, mechanical pressing: tox lock) for attaching the electrical conductor mechanisms 200 to the stabs 106 could be employed, without departing from the scope of the disclosed concept.

In the example of FIG. 3, the electrical conductor mechanisms are generally square-shaped copper tabs 202,202', which are attached to a corresponding contact surface 108, 110,112,114 of the stab 106. More specifically, each of the stabs 106 has a first segment 116, which is structured to receive a corresponding one of the circuit breakers 8 (FIGS. 1 and 2), and a second segment 118, which is structured to receive another corresponding one of the circuit breakers 10 (shown in phantom line drawing in FIG. 1). One of the planar members 202' (e.g., without limitation, copper tabs 202') is disposed on the first segment 116 (substantially shown in hidden line drawing in FIG. 3), and a second one of the planar members 202 (e.g., without limitation, copper tabs 202) is disposed on the second segment 118. That is, the first planar member 202' is disposed on the first contact surface 108 of the first segment 116, and the second planar member 202 is disposed on the second contact surface 114 of the second segment 118. Accordingly, in the example shown and described herein, the planar members or copper tabs 202,202' are disposed on opposite sides of the stab 106, as shown. It will, however, be appreciated that alternative electrical conductive mechanisms (not shown), which are disposed on both sides or contact surfaces 108,110,112,114 of the stab 106 are also contemplated by the disclosed concept. It will further be appreciated that, while the copper tabs 202,202' may be plated, such plating is not required in view of the fact the use of copper addresses and overcomes overheating issues that are commonly associated, for example, with unplated aluminum, which forms aluminum oxide.

Continuing to refer to FIG. 3, it will be appreciated that the stabs 106 of the example bus assembly 100 have a first thickness 120, and the planar members 202 (e.g., without limitation, copper tabs 202) have a second thickness 220. Preferably, the second thickness 220 of the planar members 202 is less than the first thickness 120 of the stabs 106, as shown. It will, however, be appreciated that any known or suitable alternative shape and/or configuration of electrical conductor mechanisms (not shown) other than the example copper tabs 202,202' could be employed, without departing from the scope of the disclosed concept.

Accordingly, the disclosed electrical conductor mechanism 200 provides an advantageous mechanism for relatively quickly and easily improving a electrical bus assembly 100 by providing a copper conductor 202,202' for electrically connecting electrical switching apparatus (e.g., without limitation, circuit breakers 8,10, both shown in FIG. 1) to the stabs 106, while avoiding overheating and potential fire issues associated with aluminum oxide, which is produced when electrical current is conducted through the aluminum electrical bus members 102,104 of residential load centers 2 (FIGS. 1 and 2).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical conductor mechanism for an electrical bus assembly of a power distribution system, said electrical bus assembly comprising a plurality of stabs, said power distribution system including a number of electrical switching apparatus, said electrical conductor mechanism comprising:

at least one planar member including a first side and a second side opposite the first side, the first side being structured to be attached to a corresponding one of said stabs, the second side being structured to be electrically connected to a corresponding one of said electrical switching apparatus, thereby electrically connecting said corresponding one of said electrical switching apparatus to said electrical bus assembly, wherein each of said stabs has a plurality of contact surfaces, wherein said at least one planar member is a plurality of planar members, wherein each of said planar members is structured to be attached to a corresponding one of said contact surfaces, wherein each of said stabs has a first segment structured to receive a corresponding one of said electrical switching apparatus, and a second segment structured to receive another corresponding one of said electrical switching apparatus; wherein a first one of said planar members is disposed on the first segment; and wherein a second one of said planar members is disposed on the second segment, and wherein each of the first segment and the second segment includes a first contact surface and a second contact surface disposed opposite the first contact surface; wherein said first one of said planar members is disposed on the first contact surface of said first segment; and wherein said second one of said planar members is disposed on the second contact surface of said second segment.

2. The electrical conductor mechanism of claim 1 wherein said at least one planar member is a copper tab.

3. The electrical conductor mechanism of claim 1 wherein said stabs of said bus assembly have a first thickness; wherein said at least one planar member has a second thickness; and wherein said second thickness is less than said first thickness.

4. An electrical bus assembly of a power distribution system including a number of electrical switching apparatus, said electrical bus assembly comprising:
  a number of electrical bus members;
  a plurality of stabs, each of said stabs extending outwardly from a corresponding one of said bus members; and
  at least one electrical conductor mechanism comprising:
    at least one planar member including a first side and a second side disposed opposite the first side, the first side being attached to a corresponding one of said stabs, the second side being structured to be electrically connected to a corresponding one of said electrical switching apparatus, thereby electrically connecting said corresponding one of said electrical switching apparatus to said corresponding one of said stabs,
    wherein each of said stabs has a plurality of contact surfaces,
    wherein said at least one planar member is a plurality of planar members,
    wherein each of said planar members is attached to a corresponding one of said contact surfaces,
    wherein each of said stabs has a first segment structured to receive a corresponding one of said electrical switching apparatus, and a second segment structured to receive another corresponding one of said electrical switching apparatus; wherein a first one of said planar members is disposed on the first segment; and wherein a second one of said planar member is disposed on the second segment, and
    wherein each of the first segment and the second segment includes a first contact surface and a second contact surface disposed opposite the first contact surface; wherein said first one of said planar members is disposed on the first contact surface of said first segment; and wherein said second one of said planar members is disposed on the second contact surface of said second segment.

5. The electrical bus assembly of claim 4 wherein said at least one planar member is a copper tab.

6. The electrical bus assembly of claim 4 wherein said stabs have a first thickness; wherein said at least one planar member has a second thickness; and wherein said second thickness is less than said first thickness.

7. A power distribution system comprising:
  an enclosure;
  a number of electrical switching apparatus; and
  an electrical bus assembly disposed within said enclosure, said electrical bus assembly comprising:
    a number electrical bus members;
    a plurality of stabs, each of said stabs extending outwardly from a corresponding one of said electrical bus members, and
    at least one electrical conductor mechanism comprising:
      at least one planar member including a first side and a second side disposed opposite the first side, the first side being attached to a corresponding one of said stabs, the second side being electrically connected to a corresponding one of said electrical switching apparatus, thereby electrically connecting said corresponding one of said electrical switching apparatus to said corresponding one of said stabs,
      wherein each of said stabs has a plurality of contact surfaces,
      wherein said at least one planar member is a plurality of planar members,
      wherein each of said planar members is attached to a corresponding one of said contact surfaces,
      wherein each of said stabs has a first segment for receiving a corresponding one of said electrical switching apparatus, and a second segment for receiving another corresponding one of said electrical switching apparatus; wherein a first one of said planar members is disposed on the first segment; and wherein a second one of said planar members is disposed on the second segment, and
      wherein each of the first segment and the second segment includes a first contact surface and a second contact surface disposed opposite the first contact surface; wherein said first one of said planar members is disposed on the first contact surface of said first segment; and wherein said second one of said planar members is disposed on the second contact surface of said second segment.

8. The power distribution system of claim 7 wherein said at least one planar member is a copper tab.

9. The power distribution system of claim 7 wherein said stabs of said bus assembly have a first thickness; wherein said at least one planar member has a second thickness; and wherein said second thickness is less than said first thickness.

10. The power distribution system of claim 7 wherein said power distribution system is a load center; wherein said number of electrical switching apparatus is a plurality of circuit breakers; wherein said at least one electrical conductor mechanism is a plurality of copper tabs attached to said stabs; and wherein each of said circuit breakers is electrically connected to a corresponding one of said stabs via a corresponding one of said copper tabs.

11. The power distribution system of claim 10 wherein each of said stabs includes a first segment and a second segment; wherein a first one of said copper tabs is attached to the first segment for electrically connecting a first one of said circuit breakers to the first segment; and wherein a second one of said copper tabs is attached to the second segment for electrically connecting a second one of said circuit breakers to the second segment.

* * * * *